US010542269B2

(12) United States Patent
 Kadu et al.

(10) Patent No.: US 10,542,269 B2
(45) Date of Patent: Jan. 21, 2020

(54) LOW-COMPLEXITY LOOKUP TABLE CONSTRUCTION WITH REDUCED INTERPOLATION ERROR

(71) Applicant: Dolby Laboratories Licensing Corporation, San Francisco, CA (US)

(72) Inventors: Harshad Kadu, Santa Clara, CA (US); Guan-Ming Su, Fremont, CA (US); Hanyang Sun, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/773,525

(22) PCT Filed: Dec. 7, 2016

(86) PCT No.: PCT/US2016/065440
 § 371 (c)(1),
 (2) Date: May 3, 2018

(87) PCT Pub. No.: WO2017/100359
 PCT Pub. Date: Jun. 15, 2017

(65) Prior Publication Data
 US 2018/0332296 A1 Nov. 15, 2018

Related U.S. Application Data

(60) Provisional application No. 62/265,135, filed on Dec. 9, 2015.

(30) Foreign Application Priority Data

Feb. 16, 2016 (EP) .................................... 16155882

(51) Int. Cl.
 *H04N 19/44* (2014.01)
 *G06T 5/00* (2006.01)
 (Continued)

(52) U.S. Cl.
 CPC ............. *H04N 19/44* (2014.11); *G06T 5/009* (2013.01); *H04N 19/186* (2014.11); *H04N 19/82* (2014.11); *G06T 2207/20208* (2013.01)

(58) Field of Classification Search
 CPC ...... H04N 19/44; H04N 19/82; H04N 19/186; H04N 19/30; H04N 19/98; H04N 19/70;
 (Continued)

(56) References Cited

U.S. PATENT DOCUMENTS 4,992,861 A  2/1991 D Errico
8,504,954 B1 8/2013 Arnold
 (Continued)

FOREIGN PATENT DOCUMENTS

JP  2007-072650  3/2007
JP  2007-293827  11/2007
 (Continued)

OTHER PUBLICATIONS

Lasserre S et al "Technicolor's response to CfE for HDR and WCG (category 1)—Single Layer HDR Video Coding with SDR Backward Compatibility" ISO/IEC JTC1/SC29/WG11 MPEG 2014, Jun. 2015, Warsaw, Poland.
 (Continued)

*Primary Examiner* — Tracy Y. Li

(57) ABSTRACT

In a method to reconstruct a high dynamic range video signal, a decoder receives parameters in the input bitstream to generate a prediction function. Using the prediction function, it generates a first set of nodes for a first prediction lookup table, wherein each node is characterized by an input node value and an output node value.

Then, it modifies the output node values of one or more of the first set of nodes to generate a second set of nodes for a second prediction lookup table, and generates output prediction values using the second lookup table. Low-complex-
 (Continued)

ity methods to modify the output node value of a current node in the first set of nodes based on computing modified slopes between the current node and nodes surrounding the current node are presented.

16 Claims, 4 Drawing Sheets

(51) Int. Cl.
*H04N 19/186* (2014.01)
*H04N 19/82* (2014.01)

(58) Field of Classification Search
CPC .............................. G06T 5/007; G06T 5/009; G06T 2207/20208
See application file for complete search history.

(56) References Cited

U.S. PATENT DOCUMENTS

| 8,811,490 B2 | 8/2014 | Su |
| 2011/0222080 A1 | 9/2011 | Monga |
| 2013/0177066 A1* | 7/2013 | Ye .......................... H04N 19/36 375/240.02 |
| 2014/0241418 A1* | 8/2014 | Garbas ................. H04N 19/176 375/240.02 |
| 2014/0369614 A1* | 12/2014 | Fenney ..................... G06T 9/00 382/233 |
| 2017/0105014 A1* | 4/2017 | Lee ........................ H04N 19/30 |

FOREIGN PATENT DOCUMENTS

| KR | 10-2015-0142622 | 12/2015 |
| KR | 10-2018-0016383 | 2/2018 |
| WO | 2014/107255 | 7/2014 |
| WO | 2015/128295 | 9/2015 |

OTHER PUBLICATIONS

Fritsch, F.N. et al "Monotone Piecewise Cubic Interpolation" SIAM Journal of Numerical Analysis, The Society, Phi PA, US, vol . 17, No. 2, Apr. 1, 1980 pp. 238-246.

White Paper Blu-ray Disc Read-Only Format, Audio Visual Application Format Specifications for BD-ROM Version 3.0, Jul. 2015, pp. 1-49.

Froehlich, J. et al "Content Aware Quantization: Requantization of High Dynamic Range Baseband Signals Based on Visual Masking by Noise and Texture" IEEE International Conference on Image Processing, pp. Aug. 19, 2016, pp. 884-888.

* cited by examiner

LOW-COMPLEXITY LOOKUP TABLE CONSTRUCTION WITH REDUCED INTERPOLATION ERROR

CROSS-REFERENCE TO RELATED APPLICATIONS

This application claims the benefit of the U.S. Provisional Application No. 62/265,135, filed Dec. 9, 2015; and also claims priority to European Patent Application No. 16155882.0, filed Feb. 16, 2016, entire contents of which are incorporated by reference in their entirety.

TECHNOLOGY

The present invention relates generally to the generation of lookup tables. More particularly, an embodiment of the present invention relates to generating a 3D lookup table for video prediction with reduced interpolation error.

BACKGROUND

The development and adoption of international audio and video coding standards, such as MPEG-2, MPEG-4, H.264, and more recently H.265 (also known as HEVC), has been instrumental for the rapid development, adoption, and proliferation of standard-based devices and communication standards, such as DVD players, Blu-Ray players, and the ATSC and DVB standards for digital television broadcasting.

Display technologies being developed by Dolby Laboratories, Inc., and others are able to reproduce images having high dynamic range (HDR) and wide color gamut. Such displays can reproduce images that more faithfully represent real-world scenes than conventional displays of standard dynamic range (SDR).

As used herein, the term 'dynamic range' (DR) may relate to a capability of the human visual system (HVS) to perceive a range of intensity (e.g., luminance, luma) in an image, e.g., from darkest darks (i.e., blacks) to brightest whites (i.e., highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n≥8 may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

In many real-time implementations, as a trade-off between computational complexity and computational accuracy, computations may be expedited by using lookup tables (LUTs). As appreciated by the inventors here, improved techniques for the generation of LUTs, especially for LUTs related to the prediction of high-dynamic range data, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
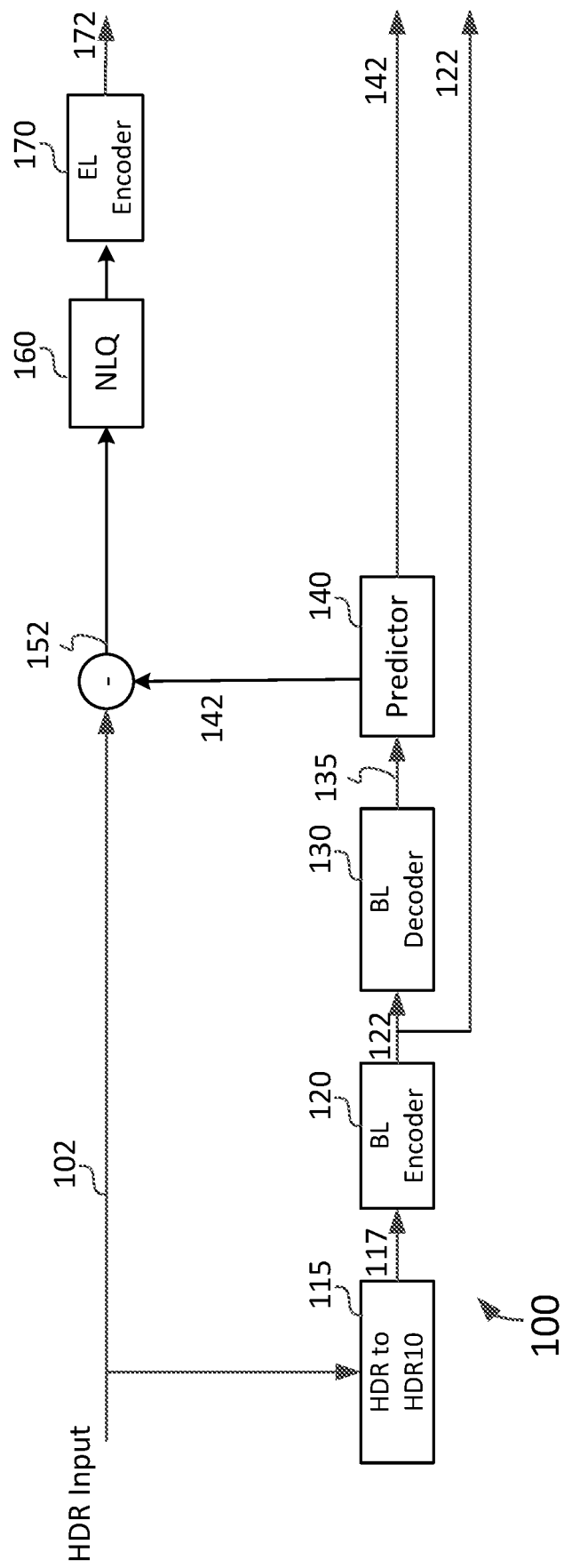
FIG. 1 depicts an example processes for the video delivery of HDR video using a base layer and an enhancement layer.

Low-complexity construction of lookup tables with reduced interpolation error is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to low-complexity construction of lookup tables with reduced interpolation error. In a method to reconstruct a high dynamic range video signal, a decoder receives parameters in the input bitstream to generate a prediction function. Using the prediction function, it generates a first set of nodes for a first prediction lookup table, wherein each node is characterized by an input node value and an output node value. Then, it modifies the output node values of one or more of the first set of nodes to generate a second set of nodes for a second prediction lookup table, and generates output prediction values using the second lookup table.

In an embodiment, modifying the output value of a current node in the first set of nodes comprises computing a modified current node based on a weighting parameter and on one or more modified slopes between the current node and four nodes bracketing the current node.

Video Delivery for High Dynamic Range (HDR) Video

According to a recent white paper by the Blu-Ray Disc Association, titled, "*Audio Visual Application Format Specifications for BD-ROM Version 3.0,*" White paper Blu-Ray Disc Read-only Format (Ultra HD Blu-ray), Blu-Ray Disc Association, July 2015, which is incorporated herein by reference in its entirety, the proposed Ultra HD Blu-ray standard supports a mandatory single-layer (10-bit, YCbCr 4:2:0) Blu-Ray Disc Movie (BDMV) EDR format (also to be referred as the HDR10 format) and an optional Dolby Vision, dual-layer, HDR format.

Dolby Vision™ for consumer applications is an end-to-end technology suite that enables the creation and distribution of content mastered with a high dynamic range and wide color gamut. Dolby Vision display management matches the capability of a given television by using a series of algorithms to map the signal to any Dolby Vision consumer television. This creates an optimal and seamless video experience for the viewer. As used herein, the term "Dolby Vision video" denotes either EDR or HDR video.

In an embodiment, the Dolby Vision HDR stream is composed by a base layer (BL) BDMV EDR video stream and a Dolby Vision enhancement layer (EL) video stream with associated metadata. A generic Blu-ray decoder will only be able to play back the HDR10 base layer; however, a Dolby Vision-enabled player will be able to combine the base layer and the enhancement layer to generate a 12-bit HDR video output with better dynamic range than the dynamic range of the default HDR10 stream.

The Dolby Vision stream is characterized by the following:

BT.2020 color primaries with non-constant luminance

An EOTF (Electro-optical transfer function) based on SMPTE 2084

A combined BL/EL bit depth of 12 bits

FIG. 1 depicts a layered HDR encoder architecture (100) in accordance with an example embodiment. In an embodiment, all video coding in the base and enhancement coding layers may be performed in the YCbCr 4:2:0 color space. HDR image encoder (100) may be implemented by one or more computing devices.

The HDR image encoder (100) is configured to receive a high-resolution (e.g., UHD) input HDR image (102). As used herein, an "input HDR image" refers to an enhanced or high dynamic range image data (e.g., raw image data captured by a high-end image acquisition device and the like) that may be used to derive a HDR version of the input image. The input HDR image (102) may be in any color space that supports a high dynamic range color gamut. In an embodiment, the input HDR image is a 12-bit or higher YCbCr image, which may have been originally in the RGB space. As used herein, for an image with multiple color components (e.g., RGB or YCbCr), the term n-bit image (e.g., 12-bit or 8-bit image) denotes an image where each pixel of its color components is represented by an n-bit pixel. For example, in an 8-bit RGB image, each pixel comprises of three color components, each color component (e.g., R, G, or B) is represented by 8-bits, for a total of 24 bits per color pixel.

Each pixel may optionally and/or alternatively comprise up-sampled or down-sampled pixel values for one or more of the channels in the color space. It should be noted that in some embodiments, in addition to three primary colors such as red, green and blue, different primary colors may be concurrently used in a color space as described herein, for example, to support a wide color gamut; in those embodiments, image data as described herein includes additional pixel values for those different primary colors and may be concurrently processed by techniques as described herein.

HDR to HDR10 (115) converter converts the high bit-depth HDR input (102) to a BL image (117) of lower depth (e.g., a 10-bit image). Typically, it is beyond the scope of any coding standard on how the 10-bit HDR Layer (117) is generated from the original HDR input (102). Some embodiments may use dynamic-range conversion techniques such as those described in PCT Application Ser. No. PCT/US2013/073085, filed on Dec. 4, 2013, also published as WO2014/107255, to be referred as the '085 application, which is incorporated herein by reference in its entirety.

BL image encoder (120) is configured to encode/format the BL image (117) to generate a coded (or compressed) BL image (122). BL encoder may be any of the known video encoders, such as those specified by the ISO/IEC H.264 or HEVC standards, or other encoders, such as Google's VP9 and the like.

BL decoder (130) in the HDR image encoder (100) decodes the image data in the base layer image container into a decoded base layer image (135). Signal 135 represents the decoded BL as will be received by a compliant receiver. The decoded base layer image (135) is different from the BL image (117), as the decoded base layer image comprises coding changes, rounding errors and approximations introduced in the encoding and decoding operations performed by the BL encoder (120) and the BL decoder (130).

Predictor (140) performs one or more operations relating to predicting the HDR input signal (102) based on the decoded BL stream (135). The predictor (140) attempts to implement the reverse of operations performed by the HDR to HDR10 converter (115). Example embodiments of such a predictor are described in the '085 PCT Application and may include a multi-channel, multiple regression (MMR) predictor, as described in U.S. Pat. No. 8,811,490, "Multiple color channel, multiple regression predictor," which is incorporated herein by reference in its entirety. The predictor output (142) is subtracted from the HDR input (102) to generate residual (152).

In an example embodiment, an enhancement layer quantizer (NLQ) (160) in the HDR image encoder (100) is configured to quantize the HDR residual values (152) from a high bit-depth digital representation (e.g., 12 bits) to a lower digital representation (e.g., 10 bits or 8 bits) using an NLQ function determined by one or more NLQ parameters. The NLQ function may be linear, piece-wise linear, or non-linear. An example of non-linear NLQ design is described in the '085 PCT Application.

Enhancement layer (EL) encoder (170) is configured to encode the residual values in an enhancement layer image container to generate the coded EL stream (172). EL encoder (170) may be any of the known video encoders, such as those specified by the ISO/IEC H.264 or HEVC standards, or other encoders, such as Google's VP9 and the like. EL and BL encoders may be different or they may be the same.

The set of parameters used in the predictor (140) and NLQ (160) may be transmitted to a downstream device (e.g., an HDR decoder) as a part of supplemental enhancement information (SEI) or other similar metadata carriers available in video bitstreams (e.g., in the enhancement layers) as metadata (142). Such metadata may include, but are not limited to, information as: color space or gamut information, dynamic range information, tone mapping information, or other predictor, up-scaling, and quantizer operators, such as those described herein.

After generating all parts of the layered HDR stream, the coded EL stream (172), the coded BL stream (122), and related metadata (142) are multiplexed and packetized so that they can be stored in a storage medium and/or be transmitted to a decoder.

Decoding Process

Figure 2:
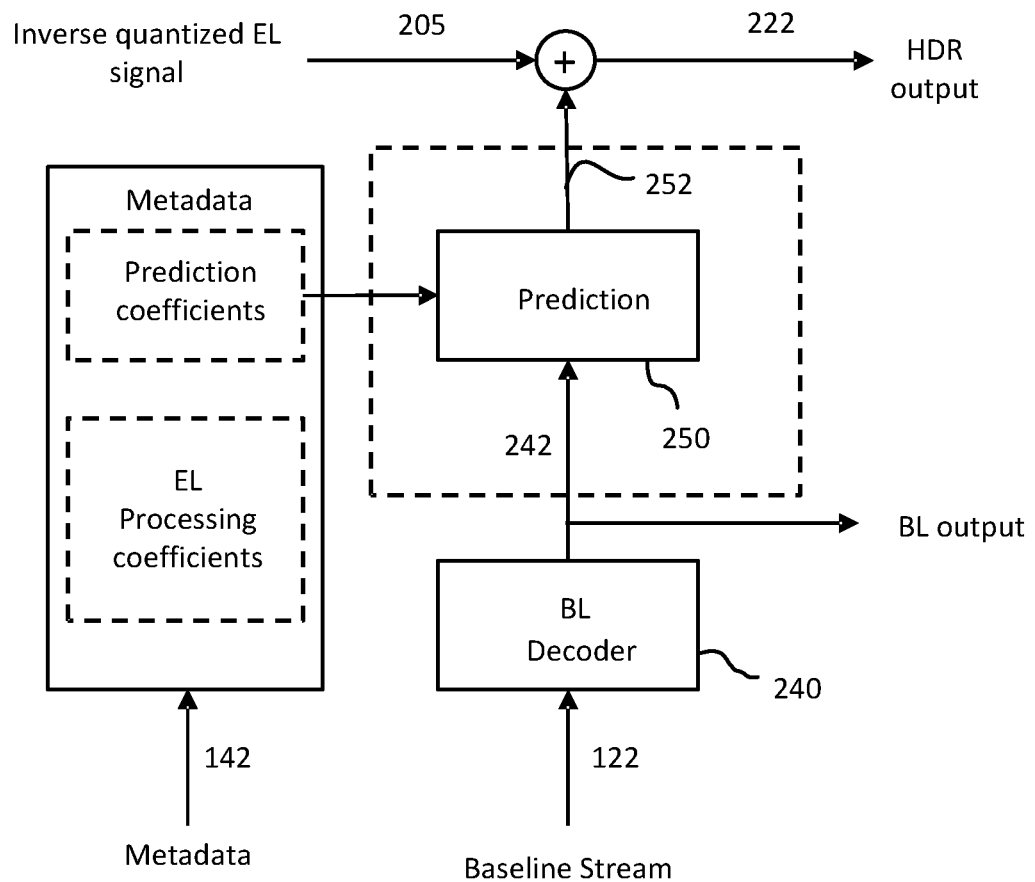
FIG. 2 depicts an example process for HDR video decoding according to an embodiment of this invention.

FIG. 2 depicts an example decoding process of the base layer (BL) and the enhancement layer according to an embodiment. Given a coded HDR bitstream generated by encoder (100), a receiver will demultiplex the base layer (122), the enhancement layer (172), and associated metadata (142). Baseline decoder (240) matches BL decoder (130) and generates the decoded BL samples (242) which can be passed to display on an SDR or HDR10 display. The decoded BL signal (242) is mapped to the dynamic range of the EL signal domain using pre-selected prediction coefficients signaled in the metadata (142). In an embodiment, predicted BL signal's decimal values are in the range of [0,1). The predicted BL signal (252) will be added to the inverse quantized EL signal (205) to reconstruct the HDR output (222). Prediction (250) should match the predictor (140) in the encoder.

Different prediction methods can be applied. For example, for a Dolby Vision stream in an Ultra-HD Blu-ray decoder, the prediction method for the luma channel is a piece-wise polynomial up to the second order. For example, given a sample S, full polynomial prediction for an N-order polynomial may be calculated according to $$R = \sum_{i=0}^{N} \text{fpoly\_coef}_i * (S/2^{BL\_bit\_depth})^i, \quad (1)$$

where fpoly_coef are prediction coefficients signaled in the Dolby Vision metadata (142) and BL_bit_depth denotes the bit depth of the base layer (e.g., 8 bits). The calculation can be carried out in fixed point or 32-bit floating point.

For the chroma channels, the prediction method may be a piece-wise polynomial up to the second order or multivariate multiple-channel regression up to the third order. For example, given a color sample $S^i = (S_0^i, S_1^i, S_2^i)$, multiple-channel multivariate regression may be expressed as:

$$R = m_0 + \sum_{i=1}^{N}(m_1[i] \cdot S_0^i + m_2[i] \cdot S_1^i + m_3[i] \cdot S_2^i + m_4[i] \cdot S_0^i \cdot S_1^i + \quad (2)$$
$$m_5[i] \cdot S_0^i \cdot S_2^i + m_6[i] \cdot S_1^i \cdot S_2^i + m_7[i] \cdot S_0^i \cdot S_1^i \cdot S_2^i),$$

where the coefficients $m_i$ are received in the metadata (142) and may depend on the current frame and color channel. The order N (e.g., N=2 or N=3) is specified in the metadata as well.

In a preferred decoder implementation, the decoder performs the prediction (250) using equations (1) and (2); however, in some embodiments, the decoder may not be powerful enough to perform these computations for all pixels in a frame in real time. One possible alternative would be for the decoder to construct a look-up table. For example, translating an 8-bit YCbCr value from 8 bit to 12 bits using MMR prediction would require a 256×256×256 look-up table. For 10-bit SDR, such a table would grow to 1024×1024×1024. However, there are several constrains in computing such large LUTs:

There might not be enough computational power
There might be very limited memory (especially, for consumer devices)

Hence, the size of the LUT is bounded by several hardware constrains. For example, typical 3D LUTs for prediction are about 25×45×45. Given such a LUT, prediction for input values that are not explicitly defined by the LUT nodes may be performed using known interpolation methods, such as linear, bilinear, or trilinear interpolation.

Lookup table methods known in the art typically require access to a parametric representation of the input data. Then, the optimum LUT nodes are computed so that a cost criterion, such as the minimum square error (MSE), is minimized. An example of such a method is discussed in U.S. Pat. No. 4,992,861, "Color image reproduction apparatus having a digitally operated look-up table constructed by means of a least squares algorithm." However, as described earlier, in a decoder embodiment, there is not enough computing power to compute equations (1) and (2) for all possible input values or to apply such MSE optimization techniques in real-time. Hence, an alternative, sub-optimum, but of low-complexity (hence faster), method to generate improved node values for a LUT is proposed.

The proposed LUT construction method includes two main steps:

Determine a small set of LUT nodes using the parametric equation of the predictor
Then, refine each node by looking at the slopes of the curves defined by the original nodes and their bracketing nodes The first step may utilize uniform sampling in 3D color space according to the memory and computational constrains (e.g., 25×47×47). The refinement step is described next in more detail.

Tangent-Based Node Refinement

Given a set of LUT nodes, say $(x_i, y_i)$, for i=1, 2, . . . , N, if an input value matches a node value (e.g., $S_i = x_i$), then the error between the LUT output value ($y_i$) and the output of the prediction function (e.g., R) will be zero; however, for an input value that needs to be interpolated between two nodes (e.g., $x_{i-1} < S_i < x_i$), the interpolated output may introduce significant error. Thus, the goal is to adjust the node values, e.g., generate refined nodes $(x_i, y_i + D_i)$, so that the overall interpolated error in the output of the LUT is reduced. For multi-dimensional LUTs (e.g., 3D LUTs), each node in each of the three dimensions can be modified separately.

Considering, without limitation, input data in the YCbCr color format, with normalized values in [0,1), let $N_{cb}(i) \in [0,1)$ denote normalized HDR values for the i-th Y node in a LUT to predict an HDR color component value (e.g., Cb), and let $\Delta_y = 1/(d_y-1)$ denote the sampling distance between the Y nodes, where $d_y$ denotes the number of Y nodes. Then, the tangent-based node refinement algorithm can be described as follows.

Figure 3:
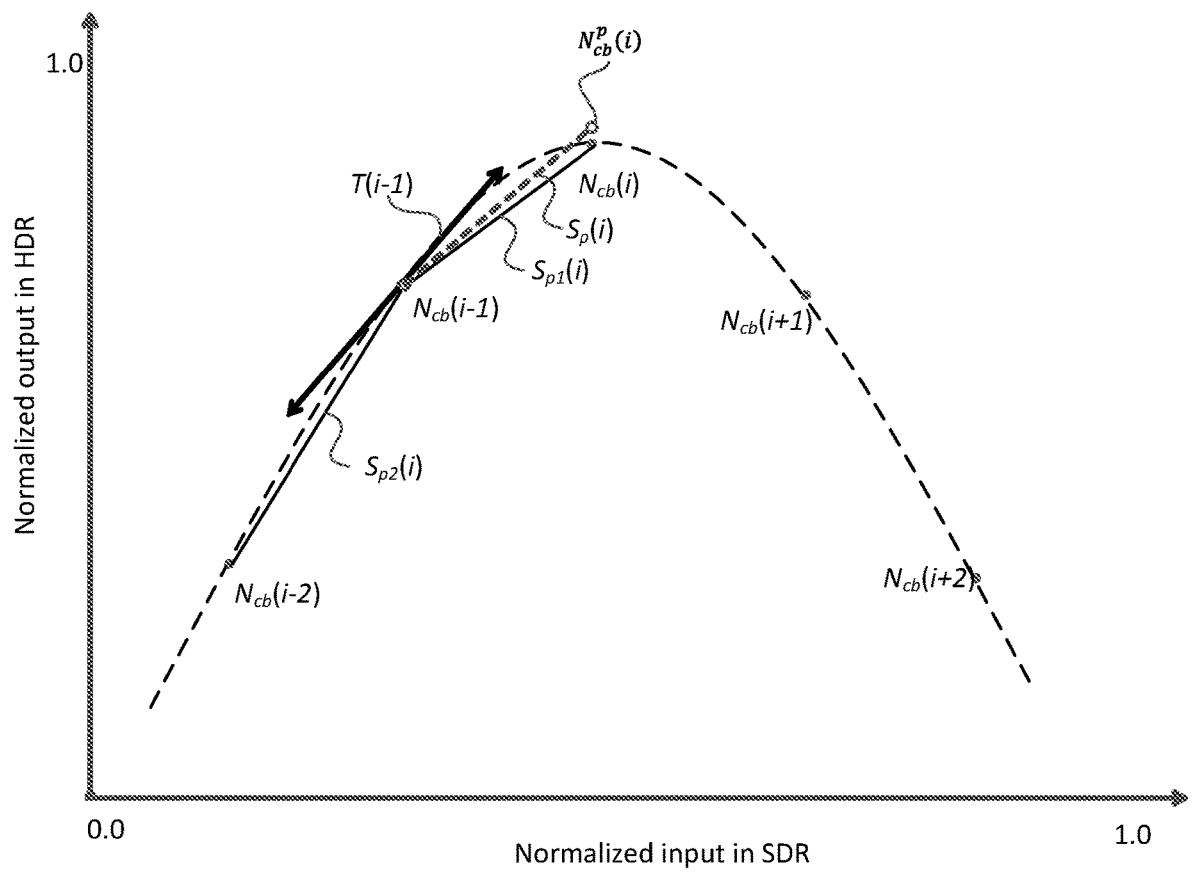
FIG. 3 depicts an example of node adjustment in a lookup table according to an embodiment of this invention.

For illustration, as depicted in FIG. 3, only the modification for the LUT nodes of the Cb component in one dimension (Y) is explained. The modifications for the other nodes across all three dimensions follow a similar methodology.

1) Given node $N_{cb}(i)$, compute the slopes of the segments joining the previous two nodes and the two subsequent nodes in the sequence.

$$S_{p1}(i) = \frac{N_{cb}(i) - N_{cb}(i-1)}{\Delta_y}, \quad (3)$$

$$S_{p2}(i) = \frac{N_{cb}(i-1) - N_{cb}(i-2)}{\Delta_y},$$

$$S_{n1}(i) = \frac{N_{cb}(i+1) - N_{cb}(i)}{\Delta_y},$$

$$S_{n2}(i) = \frac{N_{cb}(i+2) - N_{cb}(i+1)}{\Delta_y}.$$

2) Next, compute the approximate slope of the tangents at nodes $N_{cb}(i-1)$ and $N_{cb}(i+1)$ using the slopes computed from the previous step.

$$T(i-1) = \frac{S_{p1}(i) + S_{p2}(i)}{2} = \frac{N_{cb}(i) - N_{cb}(i-2)}{2 * \Delta_y}, \quad (4)$$

$$T(i+1) = \frac{S_{n1(i)} + S_{n2(i)}}{2} = \frac{N_{cb}(i+2) - N_{cb}(i)}{2 * \Delta_y}.$$

3) In an embodiment, considering the two previous nodes and $T(i-1)$ (see FIG. 3), the intuition is that the modified value of the node $N_{cb}(i)$ should be on the line starting at $N_{cb}(i-1)$ and whose slope is somewhere between the slopes $T(i-1)$ and $S_{p1}(i)$, but more biased towards $S_{p1}(i)$. We compute this slope as, $$S_p(i) = \quad (1)$$
$$\frac{\beta * S_{p1}(i) + T(i-1)}{(1+\beta)} = \frac{(2\beta+1) * N_{cb}(i) - 2\beta * N_{cb}(i-1) - N_{cb}(i-2)}{2 * \Delta_y * (1+\beta)},$$

where $\beta$ is a weighting parameter which is heuristically determined (e.g., $\beta = 3$). Given, the above, a modified node $N_{cb}^P(i)$ is computed as $$N_{cb}^P(i) = N_{cb}(i-1) + S_p(i) * \Delta_y. \quad (2)$$

From equation (5), the above equation may be simplified as $$N_{cb}^P(i) = c1 * N_{cb}(i) + c2 * N_{cb}(i-1) + c3 * N_{cb}(i-2), \text{ where} \quad (3)$$

$$c1 = \frac{\beta + 0.5}{(1+\beta)}, c2 = \frac{1}{(1+\beta)}, \text{ and } c3 = \frac{-0.5}{(1+\beta)}.$$

4) Similarly, an updated $N_{cb}^n(i)$ node may be computed using the two subsequent nodes. Let $$S_n(i) = \frac{\beta * S_{n1}(i) + T(i+1)}{(1+\beta)}. \quad (8)$$

By applying the slope $S_p$ and starting point $N_{cb}(i-1)$, one may compute the modified $N_{cb}^n(i)$ value as $$N_{cb}^n(i) = N_{cb}(i+1) - S_n(i) * \Delta_y, \quad (9)$$

or, as in step 3, the above equation may be simplified as $$N_{cb}^n(i) = c1 * N_{cb}(i) + c2 * N_{cb}(i+1) + c3 * N_{cb}(i+2). \quad (10)$$

5) The modified value of the node $N_{cb}(i)$ is then the average of prediction of the past and the future nodes.

$$N_{cb}(i) = \frac{N_{cb}^n(i) + N_{cb}^p(i)}{2}. \quad (11)$$

Using equations (7) and (10) for $N_{cb}^n(i)$ and $N_{cb}^p(i)$, from equation (11), the modified LUT node can be computed using a simple 5-tap filter $$N_{cb}(i) = c1 * N_{cb}(i) + 0.5 * c2 * (N_{cb}(i-1) + N_{cb}(i+1)) + \quad (12)$$
$$0.5 * c3 * (N_{cb}(i-2) + N_{cb}(i+2)) ==$$
$$c1 * N_{cb}(i) + c2' * (N_{cb}(i-1) + N_{cb}(i+1)) +$$
$$c3' * (N_{cb}(i-2) + N_{cb}(i+2)), \text{ where}$$

$$c2' = \frac{0.5}{(1+\beta)} \text{ and } c3' = \frac{-0.25}{(1+\beta)}.$$

6) The modified $N_{cb}(i)$ value replaces the old value in the 3D-LUT for all subsequent computations. In an embodiment, given equations (7), (10), and/or (12), one may test the node-refinement algorithm for a variety of $\beta$ values and test sequences, and then select the value of $\beta$ that yields the best video quality or optimizes some other criterion (e.g., mean square error) under the given complexity constrains.

For multi-dimensional LUTs, the above computations, from step 1 to 5, may be repeated for all nodes and across all dimensions. For example, returning to our previous example in the YCbCr color space, where Cb and Cr HDR chroma components are predicted using Y, Cb, and Cr SDR values, after updating the $N_{cb}(i)$ nodes across the Y axis, one may also compute modified $N_{cb}(j)$ (j=1, 2, . . . , $d_{Cb}$) and $N_{cb}(k)$ (k=1, 2, . . . , $d_{Cr}$) node values across the Cb and Cr axes respectively, where $d_{Cb}$ and $d_{Cr}$ denote the corresponding number of nodes across each axis. Then, the whole process may be repeated for other color components (e.g., $N_{cr}(i)$, $N_{cr}(j)$, and $N_{cr}(k)$ values, for Cr).

In an embodiment, not all original LUT nodes are modified. For example, for an MMR predictor, experimental results have shown that only alternate nodes need to be modified.

Furthermore, during testing, it was observed that values around the center nodes (e.g., $N_{cb}(i) = 0.5$, and $N_{cr}(i) = 0.5$), are very sensitive due to representing the neutral colors. Minor modifications to these nodes in the region can have serious consequences. In a preferred embodiment, these nodes are not modified.

Table 1 summarizes the process of modifying a $d_Y \times d_{Cb} \times d_{Cr}$ YCbCr 3D LUT (to be denoted as $LUT_{Cb}$) for nodes related to the Cb color component, e.g., $N_{cb}(i,j,k) = LUT_{Cb}(Y_i, Cb_j, Cr_k)$ according to an example embodiment. A similar approach may be used to modify LUTs for the remaining components as well.

TABLE 1

Modified 3D LUT generation

```
// for Y direction
for( j = 0, j < d_cb; j++){     // along Cb direction
    for( k = 0; k < d_cr; k ++ ){   // along Cr direction
        for( i = 3; i < d_y - 2; i = i + 2 ){   // along Y direction
            N_cb (i, j, k) = c1 * N_cb (i, j, k) + c2' * (N_cb (i – 1, j, k)+N_cb (i + 1, j, k))
            +c3' * (N_cb (i – 2, j, k) + N_cb (i + 2, j, k))
        }
    }
}
// for Cb direction
for( i = 0, i < d_y ; i++){     // along Y direction
    for( k = 0; k < d_cr; k ++ ){   // along Cr direction
        for( j = 3; j < d_cb -2; j = j + 2 ){   // along Cb direction
            N_cb (i, j, k) = c1 * N_cb (i, j, k) + c2' * (N_cb (i, j – 1, k)+N_cb (i, j + 1, k))
            +c3' * (N_cb (i, j – 2, k) + N_cb (i, j + 2, k))
        }
    }
}
// for Cr direction
for( i = 0, i < d_y ; i++){     // along Y direction
    for( j = 0, j < d_cb; j++){     // along Cb direction
        for( k = 3; k < d_cr -2; k =k+2 ){   // along Cr direction
            N_cb (i, j, k) = c1 * N_cb (i, j, k) + c2' * (N_cb (i, j, k – 1)+N_cb (i, j, k + 1))
            +c3' * (N_cb (i, j, k – 2) + N_cb (i, j, k + 2))
        }
    }
}
```

Figure 4:
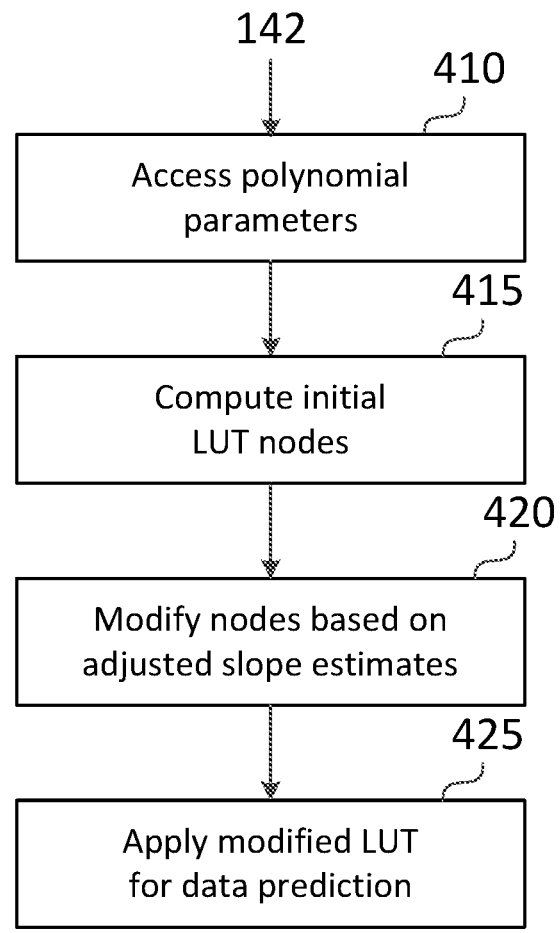
FIG. 4 depicts an example process for data prediction according to an embodiment of this invention.

FIG. 4 depicts an example process for SDR to HDR prediction according to an embodiment. Given metadata (142) received in a bitstream, in step (410), the decoder accesses the coefficients and other related metadata that define a polynomial representation of a prediction function (e.g., equation (2)). In step (415), using this prediction function, the decoder computes an initial set of nodes (e.g., $d_Y \times d_{Cb} \times d_{Cr} N_{cb}(i,j,k)$) for an initial lookup table. For a subset of these nodes, in step (420), the decoder adjusts them according to computed slopes based on estimated tangents to a prediction curve that intersect a current node, the two prior nodes to the current node, the two subsequent nodes to the current node, and a heuristic weighting parameter. Finally, in step (425), the decoder uses the modified LUT to generate the output prediction values.

While most of the discussion herein refers to generating LUTs for predicting HDR values in a decoder, a person skilled in the art would appreciate that a similar technique may also be applied to expedite the real-time processing in the predictor (140) in the encoder (100). The techniques may also be used to other applications where LUTs may be used, such as in color conversions, display management for dynamic range conversion, color gamut mapping, and the like. For example, in display management, given input pixels of an input dynamic range (say, between 0.01 nits and 5,000 nits), the display management processor in the decoder may apply a display mapping function to map these values to the dynamic range of a target display (say, between 0.1 nits and 500 nits). Such a mapping may also be expressed as a 3D LUT, where the lookup table constructions methods discussed herein may also be applied.

EXAMPLE COMPUTER SYSTEM IMPLEMENTATION

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to low-complexity construction of lookup tables, such as those described herein. The computer and/or IC may compute any of a variety of parameters or values that relate to low-complexity construction of lookup tables described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to low-complexity construction of lookup tables as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient low-complexity construction of lookup tables are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method of constructing, in a decoder, a lookup table for prediction of high dynamic range image data from standard dynamic range data received by the decoder, the method comprising:
   accessing a prediction function for the prediction of the high dynamic range image data;
   generating a first set of nodes for a first lookup table (LUT), using the prediction function, wherein each node is characterized by an input node value and an output node value;
   modifying the output node value of at least one node in the first set of nodes to generate a second set of nodes in a second lookup table, for generating predicted high dynamic range output values, said modifying comprising:
   for a current node in the first set of nodes:
      determining a first prior node and a second prior node to the current node, wherein the first prior node is closer to the current node than the second prior node;
      determining a first slope between the first prior node and the current node;
      determining a second slope between the second prior node and the first prior node;
      determining a first tangent slope to the first prior node based on the first slope and the second slope;
      determining a first modified slope based on the first tangent slope, the first slope, and a weighting parameter; and
      determining a first modified output value of the current node based on the first modified slope and the first prior node;
   generating, based at least in part on the high dynamic range image data, a high dynamic range output video signal for playback.

2. The method of claim 1, wherein modifying the output node value of at least one node in the first set of nodes further comprises:
   determining a first subsequent node and a second subsequent node to the current node, wherein the first subsequent node is closer to the current node than the second subsequent node;
   determining a third slope between the first subsequent node and the current node;
   determining a fourth slope between the second subsequent node and the first subsequent node;
   determining a second tangent slope to the first subsequent node based on the third slope and the fourth slope;
   determining a second modified slope based on the second tangent slope, the third slope, and the weighting parameter;
   determining a second modified output value of the current node based on the second modified slope and the first subsequent node; and
   determining a third modified output value of the current node based on an average of the first modified output value and the second modified output value.

3. The method of claim 1, wherein determining the first modified output value of the current node comprises computing:

$$N_{cb}^p(i)=c1*N_{cb}(i)+c2*N_{cb}(i-1)+c3*N_{cb}(i-2),$$

wherein $N_{cb}(i)$ denotes the output of the current node, $N_{cb}(i-1)$ denotes the output of the first prior node, $N_{cb}(i-2)$ denotes the output of the second prior node, and c1, c2, and c3 denote parameters computed based on the weighting parameter.

4. The method of claim 3, wherein computing the c1, c2, and c3 parameters comprises computing:

$$c1 = \frac{\beta+0.5}{(1+\beta)}, c2 = \frac{1}{(1+\beta)}, \text{ and } c3 = \frac{-0.5}{(1+\beta)},$$

wherein β denotes the weighting parameter.

5. The method of claim 2, wherein determining the second modified output value of the current node comprises computing $$N_{cb}^n(i)=c1*N_{cb}(i)+c2*N_{cb}(i+1)+c3*N_{cb}(i+2),$$

wherein $N_{cb}(i)$ denotes the output of the current node, $N_{cb}(i+1)$ denotes the output of the first subsequent node, $N_{cb}(i+2)$ denotes the output of the second subsequent node, and c1, c2, and c3 denote parameters computed based on the weighting parameter.

6. The method of claim 2, wherein determining the third modified output value of the current node comprises computing:

$$N_{cb}(i)=c1*N_{cb}(i)+c2'*(N_{cb}(i-1)$$

$$+N_{cb}(i+1))+c3'*(N_{cb}(i-2)+N_{cb}(i+2)),$$

where, $N_{cb}(i)$ denotes the output of the current node, $N_{cb}(i-1)$ denotes the output of the first prior node, $N_{cb}(i-2)$ denotes the output of the second prior node, $N_{cb}(i+1)$ denotes the output of the first subsequent node, $N_{cb}(i+2)$ denotes the output of the second subsequent node, and c1, c2', c3' denote parameters computed based on the weighting parameter.

7. The method of claim 6, wherein computing the c1, c2', and c3' parameters comprises computing:

$$c1 = \frac{\beta + 0.5}{(1+\beta)}, \text{ and } c3' = \frac{-0.25}{(1+\beta)},$$

wherein $\beta$ denotes the weighting parameter.

8. The method of claim 1, wherein modifying the output node value of at least one node in the first lookup table comprises modifying only alternate nodes among the nodes of the first lookup table.

9. The method of claim 1, wherein the first set of nodes corresponds to nodes of a 3D LUT across one of the three dimensions.

10. The method of claim 1, wherein, for each node, input and output node values are normalized to be between zero and 1.

11. The method of claim 10, wherein the node in the first set of nodes corresponding to an input node value of 0.5 is not modified.

12. The method of claim 1, wherein the number of nodes in the first set of nodes is smaller than the number of all possible input values for the prediction function.

13. A method of decoding a high dynamic range image with a decoder, the method comprising:
receiving a coded bitstream;
constructing, according to the method of any one of the foregoing claims, a lookup table for the prediction of the high dynamic range image data from standard dynamic image data in the coded bitstream; and
generating predicted high dynamic range output values from the coded bitstream by applying the constructed lookup table to the coded bitstream.

14. The method of claim 13, further comprising, before constructing the lookup table:
receiving in the coded bitstream prediction parameters for generating a prediction function; and
generating the prediction function from the prediction parameters.

15. A decoder with one or more processors performing the method of claim 1.

16. A non-transitory computer-readable storage medium having stored thereon computer-executable instruction for executing a method with one or more processors in accordance with claim 1.

* * * * *